(12) United States Patent
Mima et al.

(10) Patent No.: US 10,853,081 B2
(45) Date of Patent: Dec. 1, 2020

(54) PROCESSOR AND PIPELINING METHOD

(71) Applicant: SANKEN ELECTRIC CO., LTD., Niiza (JP)

(72) Inventors: Kazuhiro Mima, Yokohama (JP); Hitomi Shishido, Saitama (JP)

(73) Assignee: SANKEN ELECTRIC CO., LTD., Niiza (JP)

(*) Notice: Subject to any disclaimer, the term of this patent is extended or adjusted under 35 U.S.C. 154(b) by 71 days.

(21) Appl. No.: 16/201,296

(22) Filed: Nov. 27, 2018

(65) Prior Publication Data

US 2019/0163494 A1 May 30, 2019

(30) Foreign Application Priority Data

Nov. 29, 2017 (JP) .................................. 2017-229010

(51) Int. Cl.
*G06F 9/38* (2018.01)

(52) U.S. Cl.
CPC .......... *G06F 9/3867* (2013.01); *G06F 9/3804* (2013.01)

(58) Field of Classification Search
None
See application file for complete search history.

(56) References Cited

U.S. PATENT DOCUMENTS

| 6,256,728 | B1* | 7/2001 | Witt ..................... G06F 9/30021 711/E12.043 |
| 6,694,425 | B1* | 2/2004 | Eickemeyer .......... G06F 9/3851 712/216 |
| 7,013,383 | B2* | 3/2006 | Shelor .................... G06F 9/3861 712/244 |
| 7,254,700 | B2* | 8/2007 | Levitan ................. G06F 9/3804 712/205 |
| 9,489,207 | B2* | 11/2016 | Burky ................... G06F 9/3851 |
| 2009/0106495 | A1* | 4/2009 | Chou ..................... G06F 9/3004 711/130 |
| 2012/0290820 | A1* | 11/2012 | Olson .................... G06F 9/3861 712/233 |
| 2017/0075692 | A1* | 3/2017 | Kothinti Naresh ... G06F 9/3812 |
| 2018/0095766 | A1* | 4/2018 | Friedmann ............ G06F 9/3861 |

FOREIGN PATENT DOCUMENTS

| JP | H4-373023 A | 12/1992 |
| JP | 3641327 B2 | 4/2005 |
| JP | 2008-299729 A | 12/2008 |
| JP | 2011-100454 A | 5/2011 |

* cited by examiner

*Primary Examiner* — Eric Coleman
(74) *Attorney, Agent, or Firm* — Metolex IP Law Group, PLLC

(57) ABSTRACT

A processor is disclosed that performs pipelining which processes a plurality of threads and executes instructions in concurrent processing, the instructions corresponding to thread numbers of the threads and including a branch instruction. The processor may include a pipeline processor, which includes a fetch part that fetches the instruction of the thread having an execution right, and a computation execution part that executes the instruction fetched by the fetch part. The processor may include a branch controller that determines whether to drop an instruction subsequent to the branch instruction within the pipeline processor based on the thread number of the thread where the branch instruction is executed and on the thread number of the subsequent instruction.

6 Claims, 6 Drawing Sheets

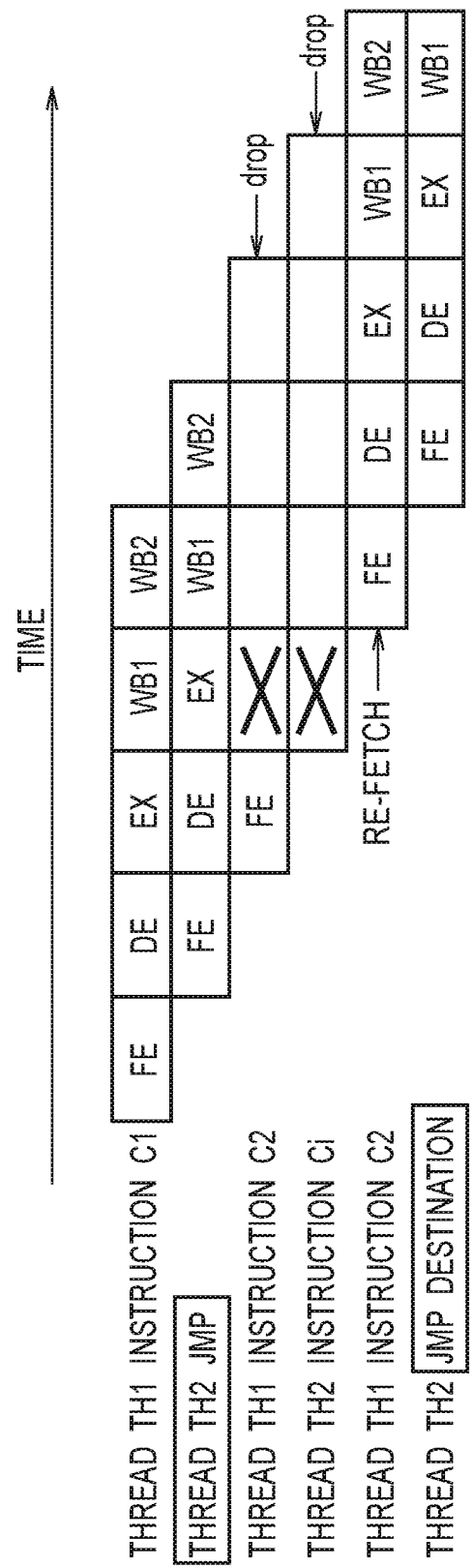

PROCESSOR AND PIPELINING METHOD

CROSS REFERENCE TO RELATED APPLICATIONS

This application claims priority based on 35 USC 119 from prior Japanese Patent Application No. 2017-229010 filed on Nov. 29, 2017, entitled "PROCESSOR AND PIPELINING METHOD", the entire contents of which are incorporated herein by reference.

BACKGROUND

The disclosure relates to a processor and a pipelining method that perform pipelining and execute a branch instruction.

A processor performs pipelining to improve processing speed. Pipelining is processing to fetch, decode, and execute instructions in such a manner that at the same time that a fetched instruction A starts to be decoded, an instruction B starts to be fetched.

In other words, in pipelining, a plurality of instructions are processed concurrently. The plurality of instructions are stored in an instruction memory constructed separately from the processor, and are linked to given addresses.

FIG. 5 illustrates a block diagram of multithreading. The multithreading illustrated in FIG. 5 involves a plurality of thresholds TH0 to TH2 linked to a plurality of instructions' addresses, and each of the threads TH0 to TH2 has its own program counter and general purpose registers. An instruction of a thread having an execution right is fetched (FE), decoded (DE), and executed.

FIG. 6 illustrates how a conventional processor that performs pipelining drops an instruction of a thread when there is a thread switch involved. In FIG. 6, FE denotes fetch; DE, decode; EX, execute; and WB1 and WB2, register write-back of data. FIG. 6 illustrates an example of pipelining where at the same time that a fetched instruction C1 starts to be decoded, a branch instruction JMP starts to be fetched.

The example illustrated in FIG. 6 has threads TH1 and TH2, and involves a thread switch. When the branch instruction JMP of the thread TH2 is executed, an instruction C2 of the thread TH1 and an instruction Ci of the thread TH2, which are subsequent to the branch instruction in the pipeline, are dropped (indicated by "x" and "drop" in FIG. 6).

As a conventional technique, there is known a processor that uses a branch mis-prediction buffer, which is described in Japanese Patent Application Publication No. 2011-100454 (Patent Literature 1). This processor executes pipelining on instructions stored in an instruction memory, and upon detection of a branch instruction, predicts the outcome of the branch instruction, and requests subsequent instructions from the instruction memory based on the predicted outcome.

This processor stores an instruction which was not predicted by the branch prediction, in order to avoid a penalty incurred by a branch prediction failure. As a result, the processor's processing speed can be improved.

SUMMARY

In accordance with one or more embodiments, a processor may be provided that performs pipelining which processes a plurality of threads and executes instructions in concurrent processing, the instructions corresponding to thread numbers of the threads and including a branch instruction. The processor includes: a pipeline processor including a fetch part that fetches the instruction of the thread having an execution right, and a computation execution part that executes the instruction fetched by the fetch part; and a branch controller that determines whether to drop an instruction subsequent to the branch instruction within the pipeline processor based on the thread number of the thread where the branch instruction is executed and on the thread number of the subsequent instruction.

Further in accordance with one or more embodiments, in the processor the branch controller may not drop and continues to execute an instruction subsequent to the branch instruction within the pipeline processor when the thread number of the thread where the branch instruction is executed is different from the thread number of the subsequent instruction.

Further in accordance with one or more embodiments, in the processor the branch controller may drop an instruction subsequent to the branch instruction within the pipeline processor when the thread number of the thread where the branch instruction is executed and the thread number of the subsequent instruction are the same.

In accordance with one or more embodiments, a pipelining method is provided for processing a plurality of threads and executing instructions in concurrent processing, the instructions corresponding to thread numbers of the threads and including a branch instruction. The method may include: performing pipelining that fetches the instruction of the thread having an execution right and executes the instruction fetched; and performing branch control to determine whether to drop an instruction subsequent to the branch instruction within the pipelining based on the thread number of the thread where the branch instruction is executed and on the thread number of the subsequent instruction.

Further in accordance with one or more embodiments, in the method the branch control may not drop and continues to execute an instruction subsequent to the branch instruction within the pipelining when the thread number of the thread where the branch instruction is executed is different from the thread number of the subsequent instruction.

Further in accordance with one or more embodiments, in the method the branch control may drop an instruction subsequent to the branch instruction within the pipelining when the thread number of the thread where the branch instruction is executed and the thread number of the subsequent instruction are the same.

Those skilled in the art will recognize additional features and advantages upon reading the following detailed description, and upon viewing the accompanying drawings.

BRIEF DESCRIPTION OF DRAWINGS

The accompanying drawings, which are incorporated herein and constitute part of this specification, illustrate exemplary embodiments of the invention, and together with the general description given above and the detailed description given below, serve to explain the features of the invention.

FIG. 6 is a diagram illustrating how a processor of a related art drops an instruction of a thread when there is a thread switch involved.

DETAILED DESCRIPTION

Figure 1:
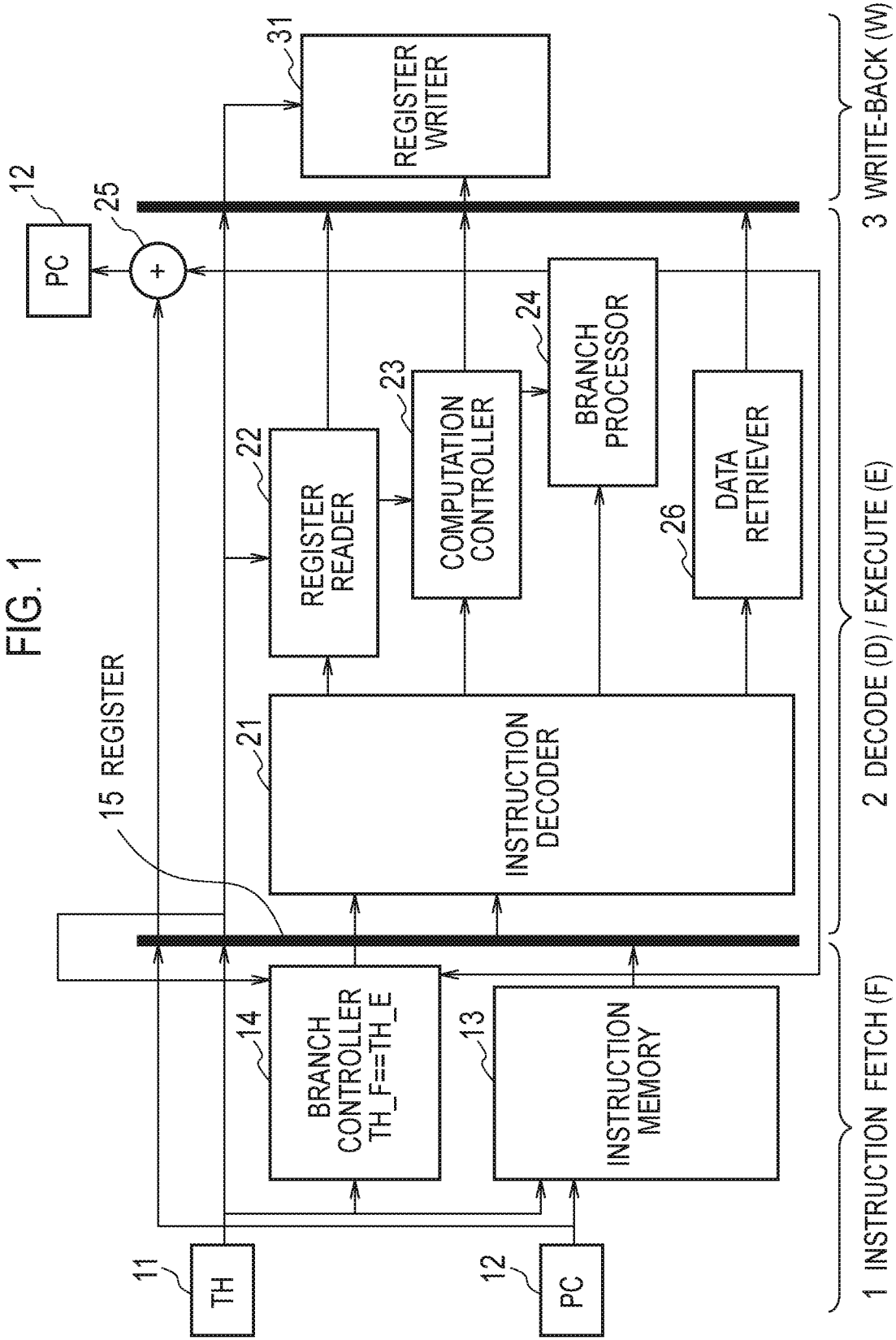
FIG. 1 is a block diagram illustrating the configuration of a processor according to one or more embodiments.

Embodiments are described with reference to drawings, in which the same constituents are designated by the same reference numerals and duplicate explanation concerning the same constituents may be omitted for brevity and ease of explanation. The drawings are illustrative and exemplary in nature and provided to facilitate understanding of the illustrated embodiments and may not be exhaustive or limiting. Dimensions or proportions in the drawings are not intended to impose restrictions on the disclosed embodiments. For this reason, specific dimensions and the like should be interpreted with the accompanying descriptions taken into consideration. In addition, the drawings include parts whose dimensional relationship and ratios are different from one drawing to another.

In pipelining, a plurality of instructions are processed concurrently. Although the following embodiment describes multithreading for processing instructions belonging to multiple threads, the present invention is also applicable to approaches other than multithreading.

First Embodiment

FIG. 1 is a diagram illustrating the configuration of a processor according to Embodiment 1. The processor according to Embodiment 1 performs pipelining that processes a plurality of threads and executes instructions in concurrent processing, the instructions corresponding to the thread numbers of the threads and including a branch instruction. The pipelining includes instruction fetch (F) 1, decode (D)/execute (E) 2, and write-back (W) 3. For example, at the same time that a fetched instruction A starts to be decoded, an instruction B starts to be fetched.

The instruction fetch (F) 1 is related to a thread number (TH) 11, a program counter (PC) 12, an instruction memory 13, and a branch controller 14. The thread number (TH) 11 is a thread number of a fetched instruction. The program counter (PC) 12 is an address on the instruction memory 13 where an address of a currently-processed instruction is stored.

The instruction memory 13 stores a sequence of instructions (C1 to C3) belonging to each thread (e.g., TH1) corresponding to the address of the program counter (PC) 12.

The branch controller 14 compares a thread number (TH) 11 and a thread number received from decode (D)/execute (E) 2, and outputs a comparison signal to an instruction decoder 21. Characteristic processing performed by the branch controller 14 will be described later.

The decode (D)/execute (E) 2 corresponds to the computation executer of the invention, and includes the instruction decoder 21, a register reader 22, a computation controller 23, the branch processor 24, an adder 25, and a data retriever 26.

The instruction decoder 21 decodes an instruction stored in a register 15, and outputs the decode result to the computation controller 23. The register reader 22 reads a flag set to 0 or 1 and stored in a flag register (not shown), and outputs the flag to the branch processor 24 via the computation controller 23.

The computation controller 23 executes an instruction decoded by the instruction decoder 21, and outputs the execution result to a register writer 31 and the branch processor 24.

When an instruction decoded by the instruction decoder 21 is a branch instruction, the branch processor 24 handles the branch instruction as follows: branch processing is performed if the flag is set to 1 indicating that the branch instruction is "taken"; and branch processing is not performed if the flag is set to 0 indicating that the branch instruction is "not taken".

When the branch processor 24 performs branch processing, the branch controller 14 checks whether the thread number TH_F of an instruction fetched by the instruction fetch (F) 1 is the same as the thread number TH_E of an instruction executed by the decode (D)/execute (E) 2 and thereby determines whether to drop the subsequent instruction. The former thread number is the thread number (TH) 11, and the latter thread number is the thread number of a branch instruction executed by the branch processor 24.

Specifically, the branch controller 14 determines whether to drop the subsequent instruction based on the thread number of the thread where a branch instruction is executed and the thread number of the instruction subsequent to the branch instruction within the pipeline processor.

The branch controller 14 does not drop the subsequent instruction and continues execution of the subsequent instruction if the thread number of the thread where a branch instruction is executed is different from the thread number of the instruction subsequent to the branch instruction within the pipeline processor.

The branch controller 14 drops the subsequent instruction if the thread number of the thread where a branch instruction is executed is different from the thread number of the instruction subsequent to the branch instruction within the pipeline processor.

The adder 25 changes the address in the register 15 based on the address from the branch processor 24, and outputs the change result to the program counter (PC) 12.

The data retriever 26 retrieves data on an instruction decoded by the instruction decoder 21, and outputs the data to the register writer 31.

The write-back (W) 3 has the register writer 31 that writes data into a register.

Next, an operation of the processor of Embodiment 1 thus configured and a pipelining method are described in detail with reference to the drawings. Note that "EX" in FIGS. 2 and 4 may correspond to the computation executer according to one or more embodiments.

Figure 2:
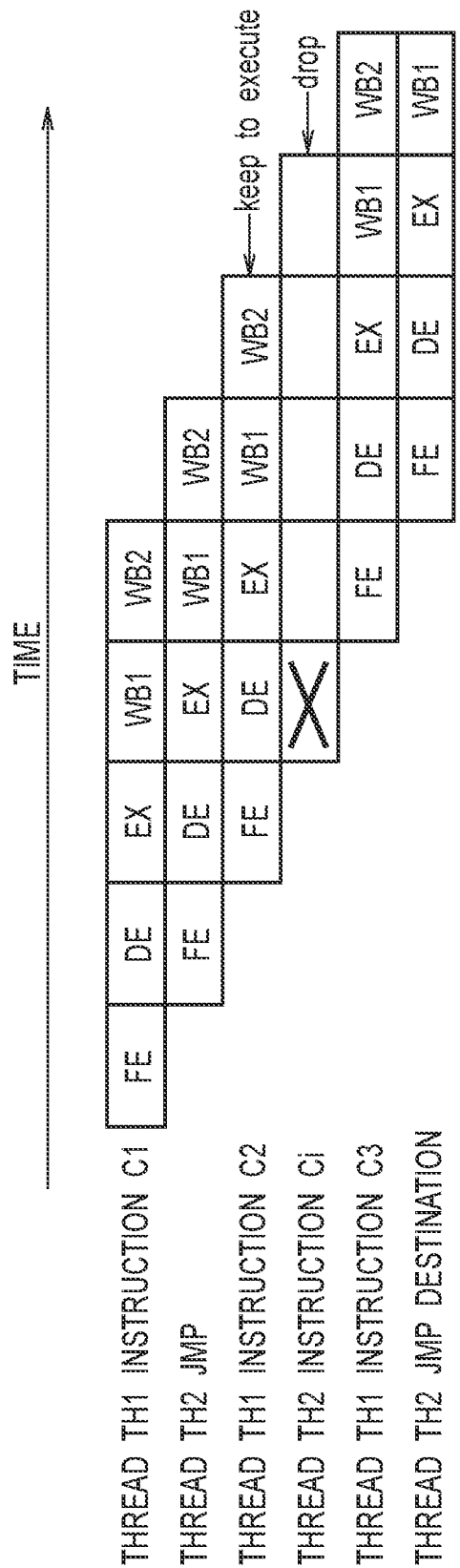
FIG. 2 is a diagram illustrating how the processor according to Embodiment 1 performing pipelining drops an instruction of a thread when there is a thread switch involved.
Figure 4:
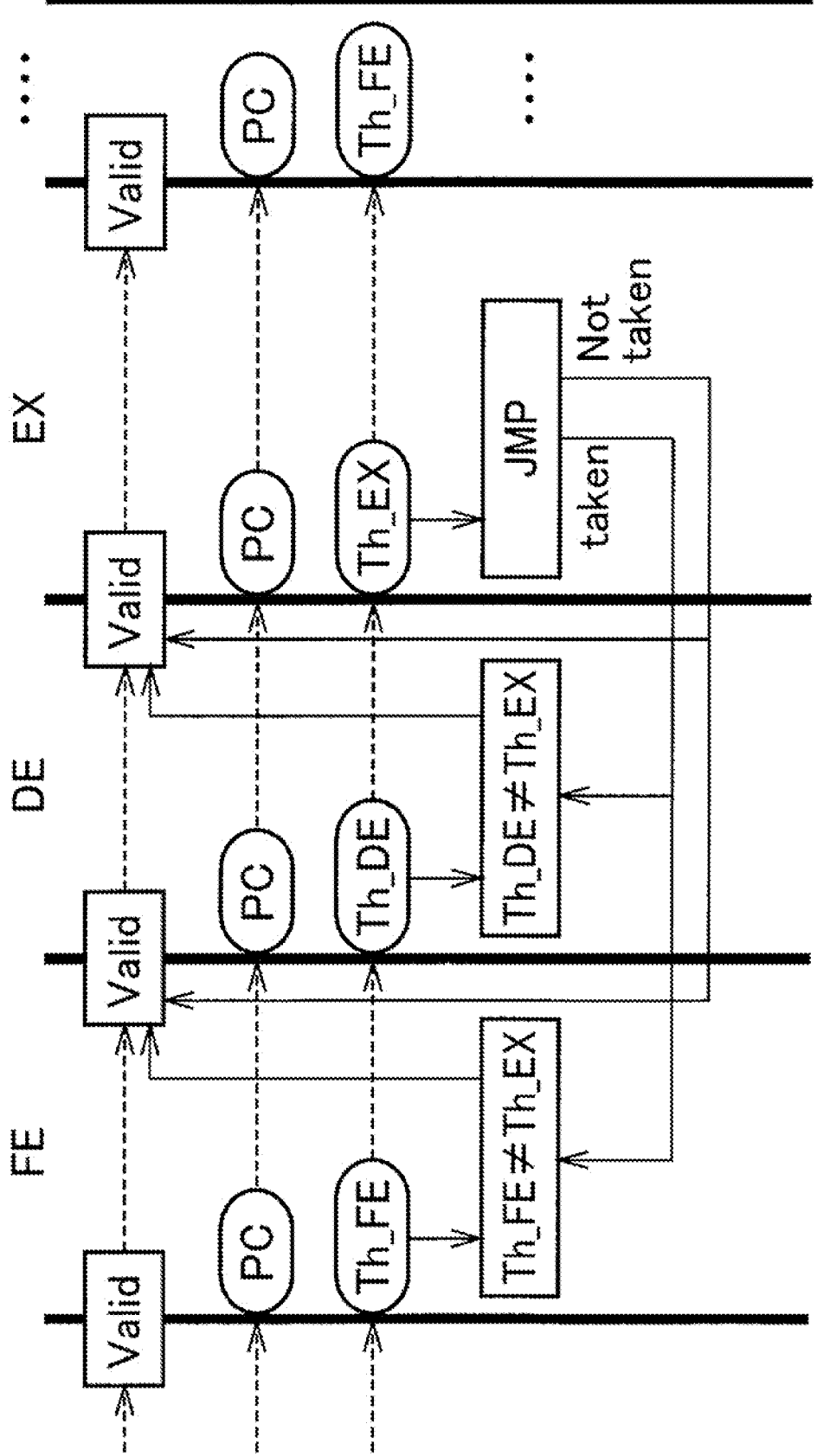
FIG. 4 is a block diagram illustrating pipelining by the processor according to one or more embodiments.
Figure 5:
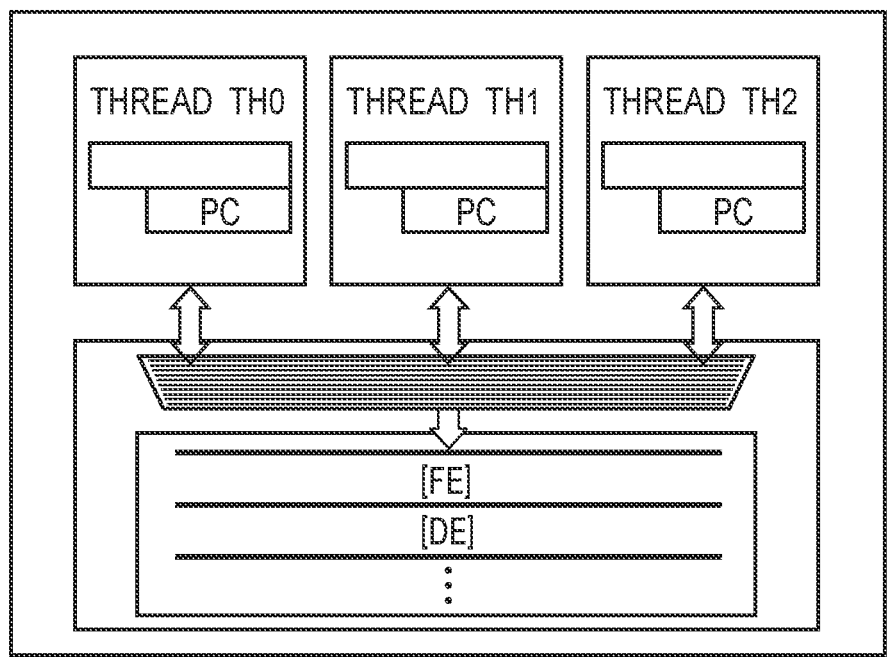
FIG. 5 is a block diagram illustrating multithreading.

First, with reference to FIGS. 2 and 4, a description is given of how the processor performing pipelining drops an instruction of a thread when there is a thread switch involved.

First, a branch instruction (JMP) of a thread TH2 is fetched (FE) to be decoded (DE) and executed (EX). Next, at the same time that the branch instruction of the thread TH2 is decoded (DE), an instruction C2 of a thread TH1 is fetched (FE) to be decoded (DE) and executed (EX).

When the branch instruction (JMP) of the thread TH2 is executed (EX), the branch processor 24 performs branch processing when the flag is set to 1 indicating that the branch instruction is "taken". In this example, the thread number TH2 of the thread where the branch instruction is executed is different from the thread number TH1 of the instruction C2 subsequent to the branch instruction within the pipeline processor. Thus, the branch controller 14 enables the Valid signal for each stage of pipelining, thereby allowing the subsequent instruction C2 not to be dropped but to be continued to be executed.

As a result, no time loss is incurred by a pipeline flush of an instruction of a different thread, which requires a do-over of the instruction of the fetch stage. This helps avoid time loss and improves processing speed. The five-stage pipeline configuration illustrated in FIGS. 2 and 4 is different from the three-stage pipeline configuration illustrated in FIG. 1; nonetheless, the invention is applicable no matter how many pipeline stages there are.

Then, when the branch instruction of the thread TH2 is executed (EX), the thread number TH2 of the thread where the branch instruction is executed is the same as the thread number TH2 of an instruction Ci subsequent to the branch instruction within the pipeline processor. Thus, the branch controller 14 disables the Valid signal for each stage of pipelining, thereby allowing the subsequent instruction Ci to be dropped.

Figure 3:
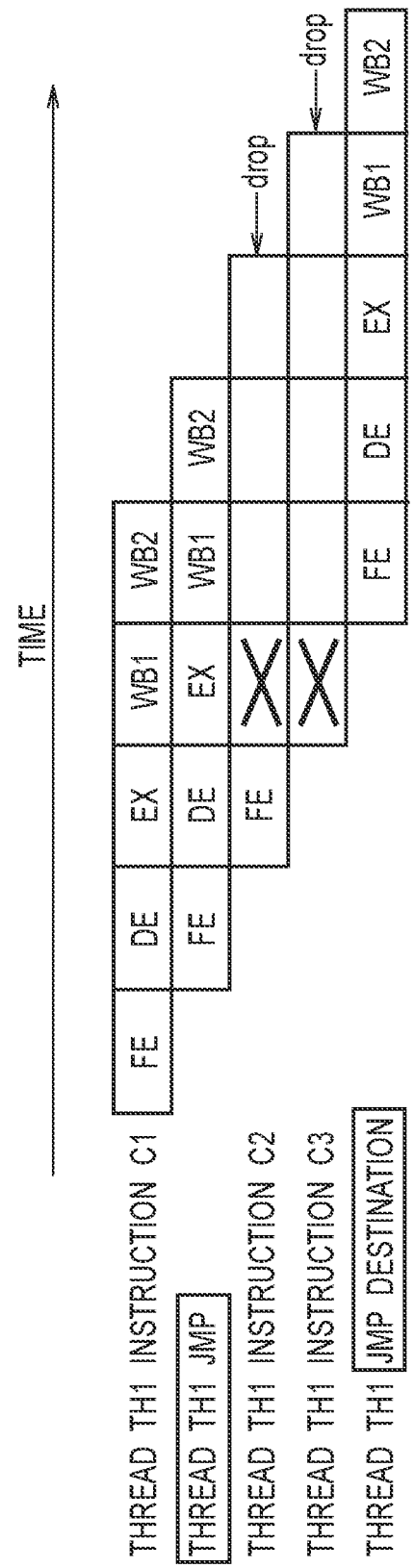
FIG. 3 is a diagram illustrating how the processor according to Embodiment 1 performing pipelining drops an instruction of a thread when there is no thread switch involved.

Next, with reference to FIG. 3, a description is given of how the processor drops an instruction when there is no thread switch involved.

First, a branch instruction (JMP) of a thread TH1 is fetched (FE) to be decoded (DE) and executed (EX). Next, at the same time that the branch instruction of the thread TH1 is decoded (DE), an instruction C2 of the thread TH1 is fetched (FE) to be decoded (DE) and executed (EX).

When the branch instruction (JMP) from the thread TH1 is executed (EX), the branch processor 24 performs branch processing if the flag is set to 1 indicating that the branch instruction is "taken". In this event, the branch controller 14 drops an instruction C2 subsequent to the branch instruction within the pipeline processor because the thread number TH1 of the thread where the branch instruction is executed is the same as the thread number TH1 of the subsequent instruction C2.

Next, the branch controller 14 drops an instruction C3 subsequent to the branch instruction within the pipeline processor because the thread number TH1 of the thread where the branch instruction is executed is the same as the thread number TH1 of the subsequent instruction C3.

Note that the determination of whether to drop the subsequent instruction may be made using the address in the program counter PC.

According to the processor and pipelining method according to the embodiment as described above, the branch controller determines whether to drop the subsequent instruction based on the thread number of the thread where the branch instruction is executed and on the thread number of the instruction subsequent to the branch instruction within the pipeline processor. Thus, the instruction subsequent to the branch instruction can be prevented from being dropped and be continued to be executed based on the thread number of the subsequent instruction. This helps avoid time loss and improves processing speed.

In conventional techniques illustrated in FIG. 6 and Patent Literature 1, instructions in the pipeline are dropped upon detection of a branch instruction. Thereafter, in order to execute the instructions thus dropped at the same time as the execution of the branch instruction, the dropped instructions have to be retrieved again (re-fetch of the instruction C2 from the thread TH1 in FIG. 6).

Then, time loss is incurred by the drop of the instruction, hindering improvement in the processor's processing speed.

In this regard, the embodiment described above can provide a processor and a pipelining method capable of helping avoid time loss and improving processing speed.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A processor that performs pipelining which processes a plurality of threads and executes instructions in concurrent processing, the instructions corresponding to thread numbers of the threads and including a branch instruction, the processor comprising:
    a pipeline processor comprising
        a fetch part that fetches the instruction of the thread having an execution right, and
        a computation execution part that executes the instruction fetched by the fetch part; and
    a branch controller that determines whether to drop an instruction subsequent to the branch instruction within the pipeline processor based on the thread number of the thread where the branch instruction is executed and on the thread number of the subsequent instruction.

2. The processor according to claim 1, wherein
    the branch controller does not drop and continues to execute an instruction subsequent to the branch instruction within the pipeline processor when the thread number of the thread where the branch instruction is executed is different from the thread number of the subsequent instruction.

3. The processor according to claim 1, wherein
    the branch controller drops an instruction subsequent to the branch instruction within the pipeline processor when the thread number of the thread where the branch instruction is executed and the thread number of the subsequent instruction are the same.

4. A pipelining method of processing a plurality of threads and executing instructions in concurrent processing, the instructions corresponding to thread numbers of the threads and including a branch instruction, the method comprising:
    performing pipelining that fetches the instruction of the thread having an execution right and executes the instruction fetched; and
    performing branch control to determine whether to drop an instruction subsequent to the branch instruction within the pipelining based on the thread number of the thread where the branch instruction is executed and on the thread number of the subsequent instruction.

5. The method according to claim 4, wherein
    the branch control does not drop and continues to execute an instruction subsequent to the branch instruction within the pipelining when the thread number of the thread where the branch instruction is executed is different from the thread number of the subsequent instruction.

6. The method according to claim 4, wherein
    the branch control drops an instruction subsequent to the branch instruction within the pipelining when the thread number of the thread where the branch instruction is executed and the thread number of the subsequent instruction are the same.

* * * * *